United States Patent

[11] 3,592,122

| [72] | Inventor | Leonard H. Hughes<br>New Orleans, La. |
|---|---|---|
| [21] | Appl. No. | 836,702 |
| [22] | Filed | June 26, 1971 |
| [45] | Patented | July 13, 1971 |
| [73] | Assignee | Texaco Inc.<br>New York, N.Y. |

[54] GAS DISPERSAL UNIT
7 Claims, 2 Drawing Figs.

[52] U.S. Cl. .................................................. 98/58,
55/264, 55/267
[51] Int. Cl. ........................................................ E04f 17/02
[50] Field of Search ............................................ 98/58, 1;
62/48; 55/227, 267, 264, 261

[56] References Cited
UNITED STATES PATENTS

| 2,760,342 | 8/1956 | Morrison | 62/48 |
| 3,121,999 | 2/1964 | Kasbohm et al. | 62/48 |
| 3,318,223 | 5/1967 | Maher | 98/1 |

Primary Examiner—Meyer Perlin
Assistant Examiner—Ronald C. Capossela
Attorneys—K. E. Kavanagh and Thomas H. Whaley ABSTRACT: An apparatus for diluting a waste, flue gas prior to discharging the latter into the atmosphere. The apparatus comprises a rotatable inductor located in a flue. A source of a gaseous diluting medium such as air, is positioned upstream of the inductor to mix with waste gas passing through the latter prior to the waste gas contacting the inductor blades. Waste gas is passed upwardly through a perforated manifold which functions as a condensing unit. In said manifold, a part of the gas flow is passed through constrictions in the manifold upper side and thence to the inductor, the remainder of the gas is condensed and passed from the manifold to a condensate collector.

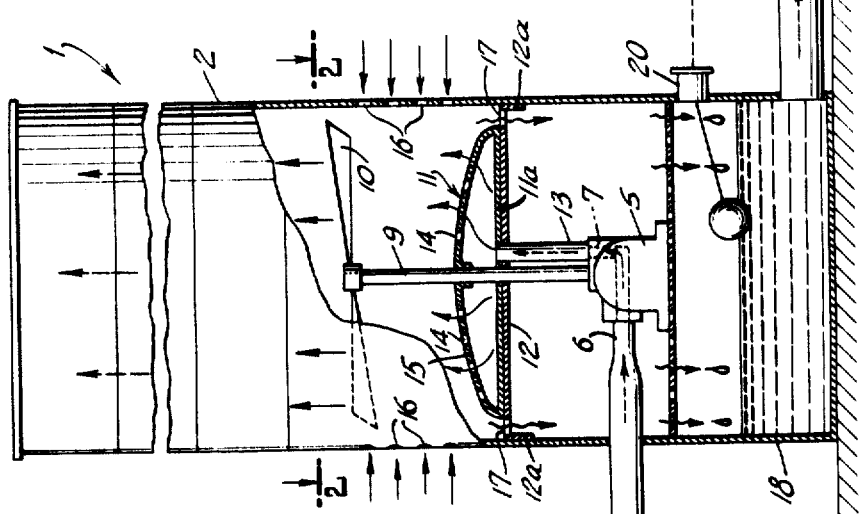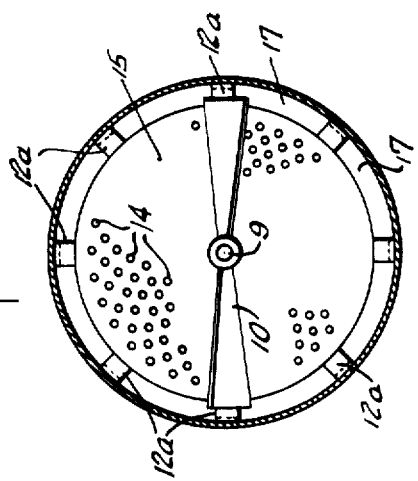

GAS DISPERSAL UNIT

BACKGROUND OF THE INVENTION

The present invention relates to the noncombustible disposal of waste gas from petroleum production. More specifically, the invention relates to dilution of waste gas with atmospheric air so that release of the mixture does not result in a hazard.

It is presently customary to dispose of waste gas from petroleum production, by burning such waste gas. On shore installations it is generally practical to locate a burner well above ground level and supply waste gas for combustion at the burner. However, the location of a flare in proximity to offshore installations can be a formidable problem. It is often sensible to limit the location of flares to minimum distances from platforms on which production and storage facilities are located.

The provision of a separate platform on which to mount a flare can loom as an expense out of proportion to the flare support function of the platform. It has become feasible to study extensively methods and means of disposing of waste gas from production platforms without ignition of the gas. One such example is a constant speed rotating fan disposed in a stack and driven by an electric motor for mixing the waste gas with air. In order to consistently mix a sufficient amount of air with the waste gas, the constant speed rotating fan must be operated at maximum speed. However, should the waste gas have peak flows which exceed the design peak flows, the hazard of a combustible mixture being disposed of to the atmosphere is presented.

In general, flammable waste gas comes from two sources within the initial production installation. Separator gas evolves continuously. Vapors originating from overpressured vessels and released through relief valves, flow in unsteady volumes. Any equipment utilized to dispose of the volumes of waste gas from separators and/or the steady flow from relief valves must be capable of continuous operation. The equipment must be sized to be ready for the maximum instantaneous rate of flow of waste gas, especially where a fixed speed motor is used to drive a fan to mix the waste gas with air. It is encompassed within the present invention to provide a means for disposing of waste gas within this requirement.

In the prior art it has been observed that natural gas may be safely dispersed in the atmosphere, provided it is first mixed with sufficient air to dilute it below combustible concentrations. For pure methane the lower limit of combustion is approximately 5 percent gas by volume. The lower limit decreases to 3.22 percent for ethane. Therefore, for a natural gas having ethane as the major component, dilution with air should be carried down to a gas concentration of approximately 3 percent.

SUMMARY OF INVENTION

In accordance with the present invention a dispersal unit for waste gas includes a stack, rotating means mounted in the stack for generating a flow of gas therethrough, a source of waste gas at a pressure above atmospheric, motor means capable of being driven by the waste gas having an inlet in communication with the source of waste gas and an exhaust disposed to deliver the waste gas into the generated flow of gas, the motor means being operatively coupled to the means for generating the flow of gas so that the speed of rotation thereof is proportional to the amount of waste gas received by the motor means, and a source of air in communication with the generated flow of gas in the stack, sufficient to dilute the waste gas to below a predetermined level resulting in a noncombustible mixture of waste gas and air.

In one embodiment a basin in provided beneath the stack to collect condensation formed therein.

A principal object of the present invention is to dilute waste gas with air prior to disposing of the mixture in the atmosphere.

Another object is to quickly dilute waste gas with air.

A further object is to mix waste gas and air in a sufficient proportion so that the mixture is noncombustible.

A still further object of the invention is to coalesce and collect the entrained droplets, mist and condensate of liquid petroleum carried in a waste gas.

Other objects and advantages of the present invention will become apparent to one skilled in the art upon consideration of the accompanying disclosure.

BRIEF DESCRIPTION OF THE DRAWING

A more complete understanding of the invention may be had by reference to the drawing in which the present invention is shown as follows.

FIG. 1 is a partially sectioned elevation of an embodiment of the present invention; and FIG. 2 is a sectioned plan view along the lines 2–2 of the embodiment shown in FIG. 1.

DESCRIPTION OF THE PREFERRED EMBODIMENT

A waste gas dispersal unit 1 embodying the present invention is illustrated in the drawing as a stack for flue 2 mounted, for example, on a horizontal surface 3, such as a production platform located offshore whereon production equipment is supported. In the bottom portion of the stack 2 a platform 4 is mounted, upon which is supported a variable speed an expansion gas operated motor 5 (which is a rotary vane type, positive displacement motor, well known in the art) having an inlet 6 and an exhaust 7.

A source of above atmospheric pressured waste gas (not shown) is connected to a waste gas conduit 8 which, in turn, is connected to the inlet 6. Waste gas from the source is thus conveyed via the waste gas conduit 8 and the inlet 6 to power the expansion gas operated motor 5. The waste gas is then exhausted from the expansion gas operated motor 5 through the exhaust 7. Power is derived from the expansion energy in the waste gas by the expansion gas operated motor 5.

A rotatably coupled shaft 9 capable of transmitting rotational movement is linked to the expansion gas operated motor 5 at one end, and to a fan blade 10 at the other end, so that the fan blade 10 is rotated in response to the performance of the expansion gas operated motor 5. Thus the speed of rotation of the fan blade 10 is dependent on the speed of the expansion gas operated motor 5 which, in turn, is dependent on the amount of waste gas being delivered to the inlet 6 from the source.

In the embodiment disclosed in the drawing the fan blade 10 is disposed to rotate in a horizontal plane within the stack for flue 2 above the expansion gas operated motor 5. A waste gas manifold 11 is disposed below the fan blade 10 and supported on a grid support 12 having tabs 12a about its periphery which are rigidly attached by welding or other means to the inside surface of the stack 2 in a narrow discontinuous line about the periphery thereof. The tabs 12a allow liquids to flow in the space between them to below the grid support 12.

Waste gas from the exhaust 7 enters the waste gas manifold 11 through a manifold inlet 13 which can be manufactured from tubing or other conduit and which is connected to the exhaust 7 at one end and to a manifold floor 11a at the bottom of the waste gas manifold 11 at the other end. One embodiment of the gas manifold 11 includes manifold floor 11a positioned transversely of flue 2. A convex, or mushroom-shaped head is joined at its periphery to the upper face of floor 11 whereby to define a chamber therebetween. A number of discharge openings 14 are disposed in the convex manifold upper surface 15 of the waste gas manifold 11, providing a relatively homogenous discharge of the waste gas throughout the cross-sectional area occupied by the manifold upper surface 15 in the stack 2 below the fan blade 10.

In one embodiment ports 16 are disposed in a band about the periphery of the stack 2 below the fan blade 10 and above the manifold upper surface 15. The ports 16 permit atmospheric air to be drawn into the stack 2 as the waste gas passes from the waste gas manifold 11 to the rotating fan blade 10. Enough ports 16 are provided so that a sufficient supply of air is always present in the stack 2 to dilute the waste gas to below a hazardous level, for example, 3 percent by volume of waste gas and the remainder air. The relatively cool air entering the stack 2 through ports 16 contacts the manifold top surface 15. Condensate develops in the waste gas and flows down toward the waste gas manifold floor 11a as the waste gas contacts the manifold upper surface 15. The waste gas then flows up through discharge openings 14.

The rotating action of the fan blade 10 causes a violent agitation of the waste gas and air, thoroughly mixing them and any condensate therein drains down on the manifold upper surface 15. The remaining mixture of waste gas and air is forced up out of the top of the stack 2 into the atmosphere.

Condensate removed from the waste gas drains down through an annular passage 17 between the manifold 11 and the stack 2 and between the tabs 12a. Discharge openings 14 extend to the bottom edge of the manifold upper surface 15 so that condensate collected therein flows out into annular passage 17. The manifold floor 11a is pitched radially downward from the center so that condensate in the waste gas manifold 11 flows out through the discharge openings 14.

The condensate is collected in a basin 18 at the bottom of the stack 2 below the platform 4. The condensate in the basin 18 can be collected and removed through a drain pipe 19 which is connected to the basin 18 at one end and to a liquid drain (not shown) at the other end, when it reaches a predetermined level. The removal of the condensate can be controlled, for example, by a float control valve 20 which, when the condensate in the basin 18 reaches a predetermined height, actuates a spring-loaded valve 21 in the drain pipe 19 to the open condition. This allows the condensate to flow through the spring-loaded valve 21 when the level of the condensate reaches the predetermined height. The method of draining as well as the float control valve 20 and the spring-loaded valve 21 are well known in the art.

In the present invention the fan blade 10 is rotated at a speed consistent with the amount of waste gas entering the stack 2. This is due to the novel powering of the expansion gas operated motor 5 which rotates the fan blade 10. At the same time volatile condensate is removed from the waste gas so that it does not enter the atmosphere.

Although the present invention is described in accordance with a specific embodiment, it is to be understood that changes and variations may be made without departing from the spirit and scope of the invention as will be easily understood by those skilled in the art.

I claim:
1. A dispersal unit for waste gas including;
   a. a stack,
   b. rotating means mounted in said stack for generating a flow of gas therethrough,
   c. a source of waste gas at a pressure exceeding atmospheric pressure,
   d. motor means capable of being driven by said waste gas, said motor means having an inlet in communication with said source of waste gas, and an exhaust outlet disposed to deliver said waste gas into said generated flow of gas, said motor means being operatively coupled to said rotating means for generating said flow of gas whereby the speed of rotation thereof is proportional to the amount of waste gas received by said motor means,
   e. a source of air in communication with said generated flow of gas in said stack being in sufficient amount to dilute said waste gas to below a predetermined level resulting in a noncombustible mixture of waste gas and air,
   f. and a waste gas manifold having an upper surface with discharge openings disposed therein, a manifold inlet connected to the lower portion thereof at one end and to said exhaust outlet of said motor means at the other end, and a collecting basin below said waste gas manifold disposed in said stack below said rotating means and in communication with said air source so that said waste gas exhausted from said motor means flows into said waste gas manifold and contacts said upper surface, thereby collecting condensate thereon, said condensate draining into said collecting basin whereby said waste gas is substantially free of condensate prior to mixture with air, thereby preventing a hazardous pocket of waste gas entering said atmosphere.

2. A dispersal unit as claimed in claim 1, which includes a waste gas conduit connected at one end to said source of waste gas and at the other end to said inlet for delivering said above atmospheric pressured waste gas to drive said motor means, a manifold inlet which is connected to said exhaust outlet, a waste gas manifold disposed below said rotating means having a manifold floor which is connected to the other end of said manifold inlet and a manifold top surface with a plurality of discharge openings therein whereby said waste gas from said source drives said motor means turning said rotating means and is exhausted to said manifold and dispersed therefrom across the entire cross section of said stack above said waste gas manifold in a turbulent zone below said rotating means wherein said waste gas is agitated and mixed with air entering said stack thereat as said rotating means generates a flow of gas through said stack.

3. Gas dispersal apparatus for diluting a stream of flue gas directed into a flue prior to said stream being discharged from said flue and into the atmosphere, which apparatus comprises;
   a. a fan (10) rotatably mounted transversely of said flue (2) and having a drive shaft (9) supportably connected thereto,
   b. inlet means (16) opening into said flue interior at a point downstream of said fan, said inlet means being communicated with a source of a gaseous diluting medium,
   c. variable speed motor means (5) having inlet and discharge ports, and being drivingly connected to said drive shaft (9), said motor means inlet port being communicated with said stream of waste gas, and said motor means discharge port opening into said flue at a point upstream of said fan,
   d. said motor means (5) being operably adjustable to regulate the rotational speed of said fan drive shaft (9) in response to the flow of gas entering said motor means inlet,
   e. whereby said motor means driving speed is automatically responsive to the amount of waste gas introduced to said flue.

4. In an apparatus as defined in claim 3 including; a gas manifold positioned transversely of said flue intermediate said motor means (5) and said fan (10), said gas manifold including a closed chamber communicated with said motor means discharge port (14) communicated with said chamber for discharging streams of said waste gas into said flue at a point upstream of said fan, and a condensate collector (18) communicated with said chamber to receive condensate formed therein.

5. In an apparatus as defined in claim 4 wherein said gas manifold includes; a floor extending transversely of said stack, and a head having said discharge openings formed therein, being connected peripherally to said floor and spaced therefrom to define said chamber therebetween.

6. In an apparatus as defined in claim 5 wherein said gas manifold floor includes; a disclike member disposed in said flue and being pitched toward a portion of the said member to direct condensate to said portion, whereby to facilitate removal of condensate from said floor.

7. In an apparatus as defined in claim 5 wherein said disclike floor includes; a raised center portion, the periphery thereof being pitched downwardly from said raised center portion, and passage means formed in said floor to receive condensate flowing along said downwardly pitched floor whereby said condensate will gravitate to said condensate collector.